(12) United States Patent
Kim

(10) Patent No.: US 9,501,191 B2
(45) Date of Patent: Nov. 22, 2016

(54) DISPLAY DEVICE WITH INTEGRATED TOUCH PANEL AND DRIVING METHOD THEREOF

(71) Applicant: LG Display Co., Ltd., Seoul (KR)

(72) Inventor: Hong Chul Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 71 days.

(21) Appl. No.: 14/522,720

(22) Filed: Oct. 24, 2014

(65) Prior Publication Data

US 2015/0116263 A1    Apr. 30, 2015

(30) Foreign Application Priority Data

Oct. 29, 2013  (KR) .................. 10-2013-0129037

(51) Int. Cl.
*G06F 3/044* (2006.01)
*G06F 3/041* (2006.01)

(52) U.S. Cl.
CPC ............. *G06F 3/044* (2013.01); *G06F 3/0412* (2013.01); *G06F 3/0416* (2013.01)

(58) Field of Classification Search
CPC ..... G06F 3/0412; G06F 3/0416; G06F 3/044
USPC ........................................................ 345/173
See application file for complete search history.

(56) References Cited

U.S. PATENT DOCUMENTS

| 2010/0059295 | A1* | 3/2010 | Hotelling | G06F 3/044 178/18.06 |
| 2011/0193571 | A1* | 8/2011 | Lin | G06F 3/044 324/679 |
| 2012/0327015 | A1* | 12/2012 | Pan | G06F 3/0416 345/174 |
| 2013/0038570 | A1* | 2/2013 | Seo | G06F 3/0416 345/174 |

* cited by examiner

*Primary Examiner* — Viet Pham
(74) *Attorney, Agent, or Firm* — Fenwick & West LLP

(57) ABSTRACT

A display device with integrated touch panel is provided. The display device includes a panel in which a plurality of pixels defined by intersections between a plurality of data lines and a plurality of gate lines are formed, a touch panel provided as one body with the panel, and configured to include a plurality of touch electrodes, a display driver IC configured to control the data lines and the gate lines formed in the panel, supply a common voltage or a touch pulse to the plurality of touch electrodes, receive analog sensing signals from the touch panel, and convert the analog sensing signals into digital sensing signals, and a touch IC configured to receive the digital sensing signals from the display driver IC, and analyze the digital sensing signals by using an analysis program based on a self-capacitance type to determine whether the touch panel is touched.

12 Claims, 4 Drawing Sheets

DISPLAY DEVICE WITH INTEGRATED TOUCH PANEL AND DRIVING METHOD THEREOF

CROSS-REFERENCE TO RELATED APPLICATIONS

This application claims the benefit of the Korean Patent Application No. 10-2013-0129037 filed on Oct. 29, 2013, which is hereby incorporated by reference as if fully set forth herein.

BACKGROUND OF THE INVENTION

1. Field of the Invention

The present invention relates to a display device, and more particularly, to a display device with integrated capacitive touch panel.

2. Discussion of the Related Art

A flat panel display (FPD) device is applied to various electronic devices such as portable phones, tablet personal computers (PCs), notebook computers, etc. Examples of the FPD device include liquid crystal display (LCD) devices, plasma display panels (PDPs), organic light emitting display devices, etc. Recently, electrophoretic display (EPD) devices are being widely used as one type of the FPD device.

In such FPD devices (hereinafter simply referred to as a display devices), LCD devices are the most widely commercialized at present because the LCD devices are easily manufactured due to the advance of manufacturing technology as well as realization of drivability through a driver and a high-quality image.

Instead of a mouse or a keyboard which has been applied to flat panel display devices in the past, a touch screen that enables a user to directly input information with a finger or a pen has been recently applied to the flat panel display devices.

Examples of an LCD device having a touch panel include an add-on type and an in-cell type.

An add-on type touch panel is manufactured independently from the panel, and is adhered to a plane of the panel. Also, the in-cell type touch panel is provided as one body with the panel.

Particularly, in an LCD device which is applied to portable terminals such as smartphones, a touch panel is integrated into a panel so as to slim the portable terminals. Such an LCD device is referred to as a display device with integrated touch panel.

FIG. 1 is an exemplary diagram illustrating a configuration of a related art display device with integrated touch panel, and particularly, is an exemplary diagram illustrating a configuration of an LCD device applied to a portable terminal such as a smartphone.

The related art LCD device with integrated touch panel which is applied to a portable terminal, as illustrated in FIG. 1, includes a panel 11 into which a touch panel 31 including a plurality of touch electrodes 30 is built, a display driver IC (DDI) 12 that controls a gate line and a data line which are formed in the panel 11, a touch driver IC (hereinafter simply referred to as a touch IC) 14 that drives the touch panel 31 which is provided in the panel 11, and a flexible printed circuit board (FPCB) 15 that is equipped with the touch IC 14 and electrically connects the display driver IC 12 to the touch IC 14.

The display device with integrated touch panel uses a time division driving method that uses the touch electrode 30 as a common electrode during an image display period, and during a touch sensing period, uses the touch electrode as a touch electrode.

Touch panels may be categorized into a self-capacitance type and a mutual type.

The related art display device with integrated touch panel into which the touch panel 31 using the self-capacitance type is built, as illustrated in FIG. 1, needs n×m number of touch electrode lines 32 in consideration of the number "n" of width-direction touch electrodes 30 and the number "m" of height-direction touch electrodes 30.

In this case, the touch electrode lines 32 is independently branched from the respective touch electrodes 30.

For example, in the touch panel 31 in which the number "n" of width-direction touch electrodes is 12 and the number "m" of height-direction touch electrodes is 20, as illustrated in FIG. 1, a total of 240 (=12×20) touch electrode lines 32 may be formed in the touch panel 31, and the 240 touch electrode lines 32 may be connected to the display driver IC 12.

The display driver IC 12 is connected to the touch IC 14 through 80 touch channel lines 16 which are formed on the FPCB 15. In this case, the display driver IC 12 connects the 240 touch electrode lines 32 to the 80 touch channel lines 16 by using a plurality of 3:1 multiplexers.

For example, the display driver IC 12 divides the touch sensing period into three sub-periods, and connects the 80 touch electrode lines among the 240 touch electrode lines to the 80 touch channel lines 16 at every ⅓ touch sensing period.

The related art display device with integrated touch panel has the following problems.

First, as described above, the related art display device with integrated touch panel includes the display driver IC 12 mounted on the panel 11 and the touch IC 14 mounted on the FPCB 15.

In this case, for example, as illustrated in FIG. 1, the related art display device with integrated touch panel includes an excessive number of touch electrode lines 32 (for example, 240 touch electrode lines 32), and needs the 80 touch channel lines 16 and the touch IC 14 having a large size (6×6 $mm^2$), for electrically connecting the display driver IC 12 to the FPCB 15.

Therefore, the FPCB 15 applied to the related art display device with integrated touch panel has a bulky shape. For this reason, a process which mounts the touch IC 14 on the FPCB 15 or forms the touch channel lines 16 becomes complicated, and moreover, the manufacturing cost increases.

Second, as described above, an excessive number of the touch channel lines 16 and the touch IC 14 having a relatively large size are vulnerable to an external physical impact, and for this reason, touch ghost noise is easily caused.

Third, the touch IC 14 includes 80 pins. For this reason, there is a high possibility that an error occurs in a process of mounting the touch IC 14 on the FPCB 15, and thus, an error rate of the display device with integrated touch panel increases.

SUMMARY OF THE INVENTION

Accordingly, the present invention is directed to a display device with an integrated touch panel and a driving method thereof that substantially obviate one or more problems due to limitations and disadvantages of the related art.

An object of the present invention is to provide a display device with an integrated touch panel and a driving method thereof, in which an analog sensing block is built into a display driver IC so that a number of touch channel lines are not exposed to an FPCB, and thus, touch noise does not occur, and touch characteristic robust to an external physical impact is secured.

Another object of the present invention is to provide a display device with integrated touch panel and a driving method thereof, in which an area of an FPCB is largely reduced, and thus, a compact and small external appearance suitable for mobile terminals is implemented.

Additional features and advantages of the invention will be set forth in the description which follows, and in part will be apparent from the description, or may be learn by practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, a display device with integrated touch panel includes a panel in which a plurality of pixels defined by intersections between a plurality of data lines and a plurality of gate lines are formed; a touch panel provided as one body with the panel, and configured to include a plurality of touch electrodes; a display driver IC configured to control the plurality of data lines and the plurality of gate lines formed in the panel, supply a common voltage or a touch pulse to the plurality of touch electrodes, receive analog sensing signals from the touch panel, and convert the analog sensing signals into digital sensing signals; and a touch IC configured to receive the digital sensing signals from the display driver IC, and analyze the digital sensing signals by using an analysis program based on a self-capacitance type to determine whether the touch panel is touched.

In another aspect, a method of driving a display device with integrated touch panel includes, when an image display period arrives, by a display driver IC equipped in a panel, supplying a common voltage to a plurality of touch electrodes which are formed in the panel; when a touch sensing period arrives, by the display driver IC, supplying a touch pulse to the plurality of touch electrodes; when analog sensing signals are received from the plurality of touch electrodes, by the display driver IC, converting the analog sensing signals into digital sensing signals; transferring, by the display driver IC, the digital sensing signals to a touch IC; and analyzing, by the touch IC, the digital sensing signals by using an analysis program based on a self-capacitance type to determine whether a touch panel is touched.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In this disclosure below, an LCD device will be described as an example of a display device with integrated touch panel according to an embodiment of the present invention, but the present invention is not limited thereto. That is, the present invention may be applied to various display devices that display an image by using a common electrode and a common voltage.

Figure 1:
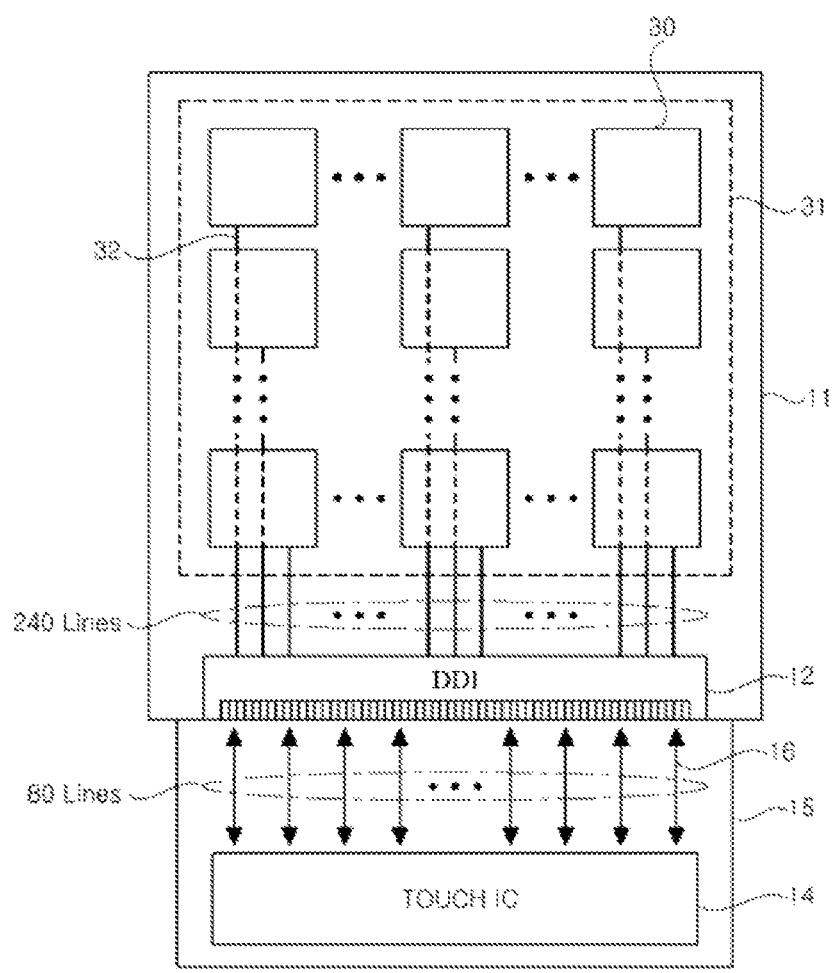
FIG. 1 is an exemplary diagram illustrating a configuration of a related art display device with integrated touch panel.
Figure 2:
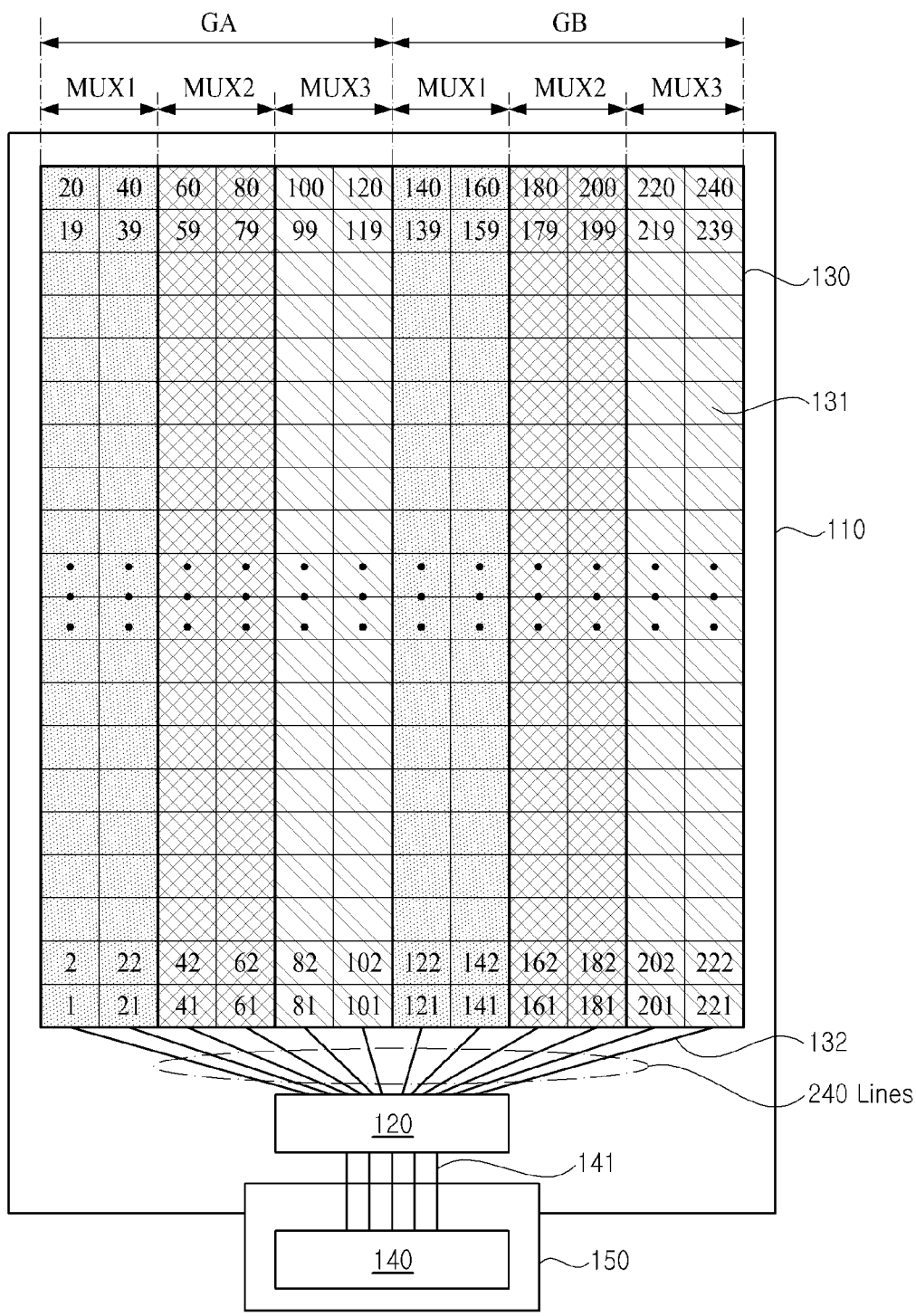
FIG. 2 is an exemplary diagram illustrating a configuration of a display device with integrated touch panel according to an embodiment of the present invention.

FIG. 2 is an exemplary diagram illustrating a configuration of a display device with integrated touch panel according to an embodiment of the present invention.

The display device of FIG. 2 relates to a display device with integrated touch panel to which a self-capacitance type is applied. The display device with integrated touch panel according to an embodiment of the present invention, as illustrated in FIG. 2, includes a touch panel 130 including a number of touch electrodes 131. The touch electrodes 131 are connected to a display driver IC 120 through a plurality of touch electrode lines 132 in one-to-one correspondence relationship. Also, in the display device with integrated touch panel according to an embodiment of the present invention, the display driver IC 120 is electrically connected to a touch IC 140, mounted on an FPCB 150, through a plurality of touch channel lines 141 which are formed on the FPCB 150.

The display device with integrated touch panel according to an embodiment of the present invention is for reducing the number of the touch channel lines 141. The display driver IC 120 includes an analog touch sensing unit that receives an analog sensing signal from the touch panel 120, and converts the analog sensing signal into a digital sensing signal. During a touch sensing period, the display driver IC 120 temporally divides the touch electrodes 131 connected to a plurality of group touch electrode switches configured with a multiplexer, and selectively drives the temporally divided touch electrodes 131. During an image display period, the display driver IC 120 simultaneously supplies a common voltage (Vcom) to all the touch electrodes connected to the group touch electrode switches.

To this end, as illustrated in FIG. 2, the display device with integrated touch panel according to an embodiment of the present invention includes: a panel 110 in which a plurality of pixels (not shown) defined by intersections between a plurality of data lines (not shown) and a plurality of gate lines (not shown) are formed; a touch panel 130 which includes the plurality of touch electrodes 131 and is provided as one body with the panel 110; a display driver IC 120 which controls the data lines and the gate lines formed in the panel 110, supplies the common voltage or a touch pulse to the touch electrodes 131, and receives an analog sensing signal from the touch panel 110 to convert the analog sensing signal into a digital sensing signal; and a touch IC 140 which receives the digital sensing signal, and analyzes the digital sensing signal by using an analysis program based on a self-capacitance type to determine whether the touch panel 130 is touched.

The panel 110 may be implemented in a type where a liquid crystal layer is formed between two glass substrates.

In this case, the plurality of data lines, the plurality of gate lines intersecting the data lines, a plurality of thin film transistors (TFTs) which are respectively formed in a plurality of areas defined by intersections between the data lines and the gate lines, a plurality of pixel electrodes for respectively charging data voltages into the plurality of pixels, and a plurality of common electrodes (the touch electrodes) 131 which drive liquid crystal charged into the liquid crystal layer along with the pixel electrodes are formed on a lower glass substrate of the panel 110. The plurality of pixels are arranged in a matrix type due to an intersection structure of the data lines and the gate lines.

A black matrix (BM) and a color filter are formed on an upper glass substrate of the panel 110.

A polarizer is adhered to each of the upper glass substrate and the lower glass substrate. An alignment layer for setting a pre-tilting angle of the liquid crystal is formed at an inner surface, contacting the liquid crystal, of both surfaces of each of the upper glass substrate and the lower glass substrate. A column space (CS) for maintaining a cell gap of the liquid crystal layer may be formed between the upper glass substrate and lower glass substrate of the panel 110.

The configuration, as described above, relates to a display device with integrated touch panel in which the touch electrodes 131 configuring the touch panel 130 are included in the panel 110.

The touch panel 130 performs a function of determining whether there is a user's touch. In particular, the touch panel 130 may use a capacitance type to which a self-capacitance type is applied. The touch panel 130 includes the plurality of touch electrodes 131 and the plurality of touch electrode lines 132.

The plurality of touch electrodes 131 may be respectively formed in the plurality of pixels formed in the panel 110. During the touch sensing period, the touch electrodes 131 perform a function of sensing a touch according to the touch pulse supplied from the touch IC 140. During the image display period, the touch electrodes 131 perform a function of driving the liquid crystal along with the respective pixel electrodes formed in the plurality of pixels.

One end of each of the plurality of touch electrode lines 132 is connected to a corresponding touch electrode 131, and the other end is connected to the display driver IC 120 through a non-display area of the panel 110.

The display driver IC 120 controls the data lines and the gate lines, and supplies the common voltage or the touch pulse to the touch electrodes 131. As illustrated in FIG. 2, the display driver IC 120 is connected to the touch IC 140 and the touch electrodes 131 configuring the touch panel 130.

In order to display an image in the panel 110, the display driver IC 120 generates a gate control signal (GCS) and a data control signal (DCS) by using a timing signal transferred from an external system (not shown), and realigns input image data signals so as to match a structure of the panel 110.

During the image display period in which an image is displayed, the display driver IC 120 supplies the common voltage to the touch electrodes 131. During the touch sensing period for sensing a touch, the display driver IC 120 supplies the touch pulse to the touch electrodes 131.

Moreover, the display driver IC 120 connects the touch electrodes 131 to the touch IC 140. That is, analog sensing signals sensed by the touch electrodes 131 are converted into digital sensing signals by the display driver IC 120, and the digital sensing signals are transferred from the display driver IC 120 to the touch IC 140 and are analyzed by the touch IC 140.

For examples, as illustrated in FIG. 2, when the number of the touch electrodes 131 configuring the touch panel 130 is 240, the number of the touch electrode lines 132 is 240. The 240 touch electrode lines 132, as illustrated in FIG. 2, are connected to the display driver IC 120 in a non-display area which is formed at an outer portion of the panel 110. In this case, the number of the touch channel lines 141 which are formed on the FPCB 150 and electrically connect the display driver IC 120 to the touch IC 140 is merely 2 to 7.

For example, in the related art display device with integrated touch panel, when the number of the touch electrode lines or the number of the touch electrodes is 240, the number of the touch channel lines which connect the display driver IC to the touch IC is 240 or "240/n±10". Here, n is the number of touch electrodes connected to a multiplexer (i.e., a switch) which is provided in the display driver IC, and is merely 2 to 5. Also, 10 is the number of communication lines which are required for communication between the display driver IC and the touch IC. Therefore, in the related art display device with integrated touch panel, when n is 3, 90 touch channel lines are formed on the FPCB which electrically connects the display driver IC to the touch IC.

However, in the display device with integrated touch panel according to an embodiment of the present invention, 2 to 7 touch channel lines 141 which include 1 to 4 touch channel lines 141 for transferring the digital sensing signals and the touch channel lines 141 which are required for communication between the display driver IC 120 and the touch IC 140 are formed on the FPCB 150 which electrically connects the display driver IC 120 to the touch IC 140.

As described above, the detailed reason that the number of the touch channel lines 141 formed on the FPCB 150 is reduced will be described below in detail with reference to FIG. 3.

The touch IC 140 receives the digital sensing signals transferred from the display driver IC 120, and analyzes the digital sensing signals by using the analysis program based on the self-capacitance type to determine whether the touch panel 130 is touched.

Detailed configurations and functions of the display driver IC 120 and the touch IC 140 will be described below in detail with reference to FIGS. 3 and 4.

Figure 3:
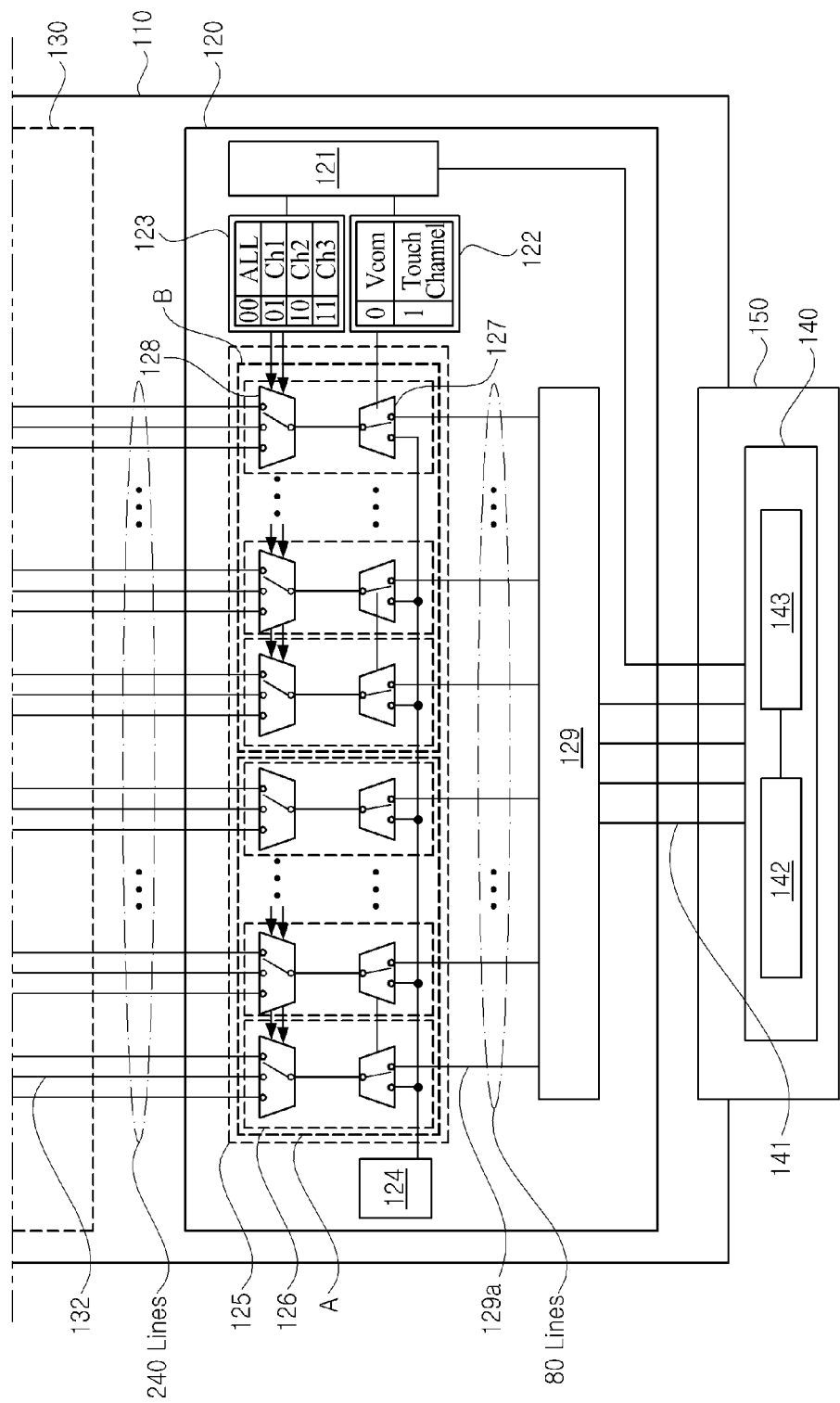
FIG. 3 is an exemplary diagram illustrating internal configurations of a display driver IC and a touch IC applied to a display device with integrated touch panel according to an embodiment of the present invention.

FIG. 3 is an exemplary diagram illustrating internal configurations of a display driver IC and a touch IC applied to a display device with integrated touch panel according to an embodiment of the present invention.

The display device with integrated touch panel according to an embodiment of the present invention, as described above, may include the panel 110, the touch panel 130 which is configured with the touch electrodes 131 and the touch electrode lines 132, the display driver IC (DDI) 120, and the touch IC 140. Here, the display driver IC 120 and the touch IC 140 are electrically connected to each other through the touch channel lines 141 which are formed on the FPCB 150. Among the elements, the panel 110, the touch electrodes 131, and the touch electrode lines 132 have been described above with reference to FIG. 2, and thus, only the display driver IC 120 and the touch IC 140 will be described below in detail.

The display driver IC 120 will now be described in detail.

The display driver IC 120, as described above, drives the data lines and the gate lines formed in the panel 110, and supplies the common voltage or the touch pulse to the touch electrodes 131 used as common electrodes. As illustrated in FIG. 3, the display driver IC 120 may include a common voltage generator 124, a touch sync signal generator 122, a channel switching signal generator 123, a switching unit 125, a controller 121, and an analog unit 129. In addition, the display driver IC 120 may further include a gate driver which supplies a scan signal to the gate lines, a data driver which respectively supplies image data signals to the data lines, and a timing controller which controls the elements.

In the following description, the display driver IC 120 and the touch IC 140 will be described, for example, when the number (hereinafter simply referred to as the total number of touch electrodes) of the touch electrode lines 132 or the touch electrodes 131 is 240, the 240 touch electrode lines 132 are connected to the switching unit 125 provided in the display driver IC 120, 80 analog channel lines 129a are formed between the switching unit 125 and the analog unit 129, and 5 channel lines 141 are formed between the analog unit 129 and the touch IC 140. That is, a display device will be described, for example, when the total number of touch electrodes is 240, the number (hereinafter simply referred to as the number of analog channel lines) of the analog channel lines 129a between the switching unit 125 and the analog unit 129 is 80, and a ratio of the total number of touch electrodes and the number of analog channel lines is 3:1. In the following description, n is simply referred to as the number of multiplexer channels, and is the number of the touch electrode lines 132 respectively connected to the group touch electrode switches 126 which are provided in the switching unit 125. Hereinafter, the touch electrode lines 132 connected to the group touch electrode switches 126 are simply referred to as multiplexer channels. Therefore, in the display driver IC 120 illustrated in FIG. 3, three multiplexer channels are connected to each of the grouch touch electrode switches 126.

The display driver IC 120, as illustrated in FIG. 3, includes: the common voltage generator 124 that generates the common voltage which is to be supplied to the touch electrodes 131; the switching unit 125 that includes the plurality of group touch electrode switches 126 connected to at least two or more of the touch electrode lines 132; the analog unit 129 that converts the analog sensing signals, transferred from the touch panel 130 through the switching unit 125, into the digital sensing signals to transfer the digital sensing signals to the touch IC 150 during the touch sensing period; the touch sync signal generator 122 that generates a touch sync signal which allows the group touch electrode switches 126 to connect the touch electrode lines 131 to the common voltage generator 124 or the analog unit 129; and the channel switching signal generator 123 that generates a channel switching signal which allows the plurality of grouch touch electrode switches 126 to be connected all the touch electrode lines 132 during the image display period and during the touch sensing period, allows the analog unit 129 to be connected to a plurality of the touch electrode lines 132 connected to each of the plurality of group touch electrode switches 126.

First, the common voltage generator 124 generates the common voltage which is to be supplied to the touch electrodes 131 that operates as the common electrodes. That is, in the present embodiment, the touch electrodes 131 sense a touch, and supply the common voltage to the pixels. The display driver IC 120 distinguishes the image display period and the touch sensing period. During the image display period, the display driver IC 120 supplies the common voltage, generated by the common voltage generator 124, to the touch electrodes 131. During the touch sensing period, the display driver IC 129 supplies the touch pulse, generated by the analog unit 129, to the touch electrodes 131.

Second, the touch sync signal generator 122 generates the touch sync signal which allows the touch electrodes 131 to be connected to the common voltage generator 124 or the analog unit 129 according to the image display period and the touch sensing period.

For example, during the image display period, the touch sync signal generator 122 switches on the switching unit 125 by using a zeroth touch sync signal '0' to allow the common electrodes 131 to be connected to the common voltage generator 124. In this case, the common voltage (Vcom) is supplied to the common electrodes 131.

During the touch sensing period, the touch sync signal generator 122 switches on the switching unit 125 by using a first touch sync signal '1' to allow the touch electrodes 131 to be connected to the analog unit 129. In this case, the touch electrodes 131 act as touch sensors.

The touch sync signal generator 122 may generate and output the above-described touch sync signals according to control by the control unit 121.

Third, during the image display period, the channel switching signal generator 123 switches on the switching unit 125 by using a zeroth channel switching signal '00' to allow the switching unit 125 to select all the common electrodes 131. In this case, since the switching unit 125 is connected to the common voltage generator 124 according to the zeroth channel switching signal '00', the common voltage (Vcom) is supplied to all the common electrodes 131.

During one-third (⅓) of the touch sensing period, the channel switching signal generator 123 switches on the switching unit 125 by using a first channel switching signal '01' to allow the switching unit 125 to select only a first multiplexer channel of the multiplexer channels.

The first channel switching signal is output, and then, during other one-third (⅓) of the touch sensing period, the channel switching signal generator 123 switches on the switching unit 125 by using a second channel switching signal '10' to allow the switching unit 125 to select only a second multiplexer channel of the multiplexer channels.

The second channel switching signal is output, and then, during other one-third (⅓) of the touch sensing period, the channel switching signal generator 123 switches on the switching unit 125 by using a third channel switching signal '11' to allow the switching unit 125 to select only a third multiplexer channel of the multiplexer channels.

In this case, since the switching unit 125 is connected to the analog unit 129 according to the first touch sync signal '1', the touch pulse is supplied from the analog unit 129 to the multiplexer channels.

A plurality of touch electrodes 131 connected to the first multiplexer channels which are selected by the switching unit 125 according to the first channel switching signal, as illustrated in FIG. 2, may configure a first touch electrode small group MUX1 at one side of the panel 110.

A plurality of touch electrodes 131 connected to the second multiplexer channels which are selected by the switching unit 125 according to the second channel switching signal, as illustrated in FIG. 2, may configure a second touch electrode small group MUX2 in the panel 110. In particular, the second touch electrode small group MUX2 may be provided adjacent to the first touch electrode small group MUX1.

A plurality of touch electrodes 131 connected to the third multiplexer channels which are selected by the switching unit 125 according to the third channel switching signal, as illustrated in FIG. 2, may configure a third touch electrode small group MUX3 in the panel 110. In particular, the third touch electrode small group MUX3 may be provided adjacent to the second touch electrode small group MUX2.

Moreover, the touch electrode small groups MUX1 to MUX3 may configure a touch electrode large group. In FIG. 2, two touch electrode large groups GA and GB are illustrated. In this case, a first touch electrode large group GA includes the first touch electrode small group MUX1, the second touch electrode small group MUX2, and the third touch electrode small group MUX3. Also, a second touch electrode large group GB includes another first touch electrode small group MUX1, another second touch electrode small group MUX2, and another third touch electrode small group MUX3. Two touch electrode large groups GA and GB are illustrated in FIG. 2, but three or more touch electrode groups may be provided in the touch panel 130.

To provide an additional description, the touch electrodes 131 are divided into two touch electrode large groups GA and GB, and the touch electrode large groups GA and GB may be sequentially arranged in a direction from one side to the other side of the touch panel 130. For example, in FIG. 2, the first touch electrode large group GA is provided at a left side of the touch panel 130, and the second touch electrode large group GB is provided at a right side of the touch panel 130.

Moreover, the touch electrodes 131 included in the touch electrode large group GA or GB may be divided into the touch electrode small groups MUX1 to MUX3 corresponding to the number "n" of touch electrode lines (multiplexer channels) connected to the group touch electrode switch 126. The touch electrode small groups MUX1 to MUX3 may be sequentially arranged in a direction from one side to the other side of the touch electrode large group GA or GB.

Fourth, the controller 121 controls functions of the touch sync signal generator 122 and the channel switching signal generator 123. Also, the controller 121 may transfer the touch sync signal, indicating the touch sensing period, to the analog unit 129 and the touch IC 140. In this case, the touch channel line for transferring the touch sync signal to the touch IC 140 may be formed on the FPCB 150.

Fifth, the switching unit 125 is directly connected to the touch electrode lines 132. Particularly, in the above-described embodiment, the switching unit 125 may be configured with 80 group touch electrode switches 126 connected to three touch electrode lines (multiplexer channels).

That is, in an embodiment of the present invention illustrated in FIG. 3, the number of the touch electrode lines 132 is 240, the number of the analog channel lines 129a which connect the switching unit 125 to the analog unit 129 is 80, and a ratio of the total number of touch electrodes and the number of analog channel lines is 3:1.

Therefore, 80 group touch electrode switches 126 equal to the number of analog channel lines are included in the switching unit 125, and each of the group touch electrode switches 126 is connected to three touch electrode lines (multiplexer channels) 132.

Here, the three touch electrode lines 132 connected to each of the group touch electrode switches 126 are respectively referred to as a first multiplexer channel, a second multiplexer channel, and a third multiplexer channel.

Hereinabove, all the multiplexer channels of all the group touch electrode switches 126 are selected by the zeroth channel switching signal '00', only the first multiplexer channels of all the group touch electrode switches 126 are selected by the first channel switching signal '01', only the second multiplexer channels of all the group touch electrode switches 126 are selected by the second channel switching signal '10', and only the third multiplexer channels of all the group touch electrode switches 126 are selected by the third channel switching signal '11'.

Here, the first to third multiplexer channels denote the touch electrode lines 132, and are defined for distinguishing a plurality of touch electrode lines connected to each of the group touch electrode switches 126.

Each of the group touch electrode switches 126 includes a first switch 127 and a second switch 128.

The first switch 127 may be configured with a multiplexer. One end of the first switch 127 is connected to the common voltage generator 124 and the analog unit 129, and the other end is connected to the second switch 128. The first switch 127 is switched on by the touch sync signal generator 122, and connects the common voltage generator 124 or the analog unit 129 to the second switch 128.

The second switch 128 may be configured with a multiplexer. One end of the second switch 128 is connected to the first switch 127, and the other end is connected to the first multiplexer channel, the second multiplexer channel, and the third multiplexer channel. The second switch 128 is switched on by the channel switching signal generator 123, and connects the common voltage generator 124 or the analog unit 129 to at least one selected from the first multiplexer channel, the second multiplexer channel, and the third multiplexer channel.

During the touch sensing period, the grouch touch electrode switch 126 may supply the touch pulse to a plurality of touch electrodes 131 included in one of the touch electrode small groups MUX1 to MUX3, and supply the touch pulse to a plurality of touch electrodes 131 included in another touch electrode small group.

For example, in the display device with integrated touch panel illustrated in FIGS. 2 and 3, during one-third of the touch sensing period, the group touch electrode switch 126 may supply the touch pulse to the first touch electrode small group MUX1 included in each of the first and second touch electrode large groups GA and GB, and then, during other one-third of the touch sensing period, the group touch electrode switch 126 may supply the touch pulse to the second touch electrode small group MUX2 included in each of the first and second touch electrode large groups GA and GB. Subsequently, during other one-third of the touch sensing period, the group touch electrode switch 126 may supply the touch pulse to the second touch electrode small group MUX3 included in each of the first and second touch electrode large groups GA and GB.

In this case, a plurality of group touch electrode switches connected to the touch electrode large group GA or GB may configure a switch group A or B, and the switch groups A and B corresponding to the touch electrode large groups GA and GB may be provided to be separated from each other in the display driver IC 120.

For example, in the display device with integrated touch panel illustrated in FIGS. 2 and 3, the number of the touch electrode large groups GA and GB is 2, and thus, the number of the switch groups A and B is 2.

When the first touch electrode large group GA is provided at the left side of the touch panel 130 as illustrated in FIG. 2, a first switch group A corresponding to the first touch electrode large group GA may be provided at a left side of the inside of the display driver IC 120 as illustrated in FIG. 3.

Moreover, when the second touch electrode large group GB is provided at the right side of the touch panel 130 as illustrated in FIG. 2, a second switch group B corresponding to the second touch electrode large group GB may be provided at a right side of the inside of the display driver IC 120 as illustrated in FIG. 3.

Sixth, during the touch sensing period, the analog unit 129 converts the analog sensing signals, transferred from the touch panel 130 through the switching unit 125, into the digital sensing signals, and transfers the digital sensing signals to the touch IC 150.

Moreover, during the touch sensing period, the analog unit 129 generates the touch pulse, and transfers the touch pulse to the touch electrodes 131 through the switching unit 125.

That is, during the touch sensing period, the analog unit 129 transfers the touch pulse to the touch electrodes 131, and receives the analog sensing signals corresponding to the touch pulse. The analog unit 129 converts the analog sensing signals into the digital sensing signals, and transfers the converted digital sensing signals to the touch IC 140 through four touch channel lines 141 which are formed on the FPCB 150.

The touch IC 140 will now be described in detail.

The touch IC 140 is for determining whether the touch electrodes 131 are touched. Particularly, a display device using the self-capacitance type analyzes a change amount of the touch pulse supplied to each touch electrode by using the digital sensing signals to determine whether each of the touch electrodes 131 is touched.

The touch IC 140 receives the digital sensing signals, and analyzes the digital sensing signals by using the analysis program based on the self-capacitance type to determine whether the touch panel is touched.

The touch IC 140, as illustrated in FIG. 3, is connected to the touch electrodes 131 through the display driver IC 120, and particularly, is connected to the touch electrodes 131 through the analog unit 129 which is provided in the display driver IC 120.

The touch IC 140, as illustrated in FIG. 3, may be connected to the display driver IC 120 through the FPCB 150.

The digital sensing signals may be transferred from the display driver IC 120 to the touch IC 140 through at least two or more the touch channel lines 141 which are formed on the FPCB 150.

The touch IC 140, as illustrated in FIG. 3, may include a memory 143, which stores the analysis program, and a touch sensing unit 142 that analyzes the digital sensing signals received from the display driver IC 120 by using the analysis program to determine whether the touch panel 130 is touched.

The analysis program may use the same analysis program as an analysis program which is used for determining whether the panel 110 is touched, in a touch IC which is applied to general display devices with integrated touch panel at present.

The memory 143 may use a flash memory. Generally, since a process of manufacturing the flash memory differs from a process of manufacturing the display driver IC 120, it is difficult for the memory 143 to be provided in the display driver IC 120.

The touch channel lines 141, as described above, may include four touch channel lines 141 for transferring the digital sensing signals and one touch channel line 141 for transferring the touch sync signal.

A method of driving the display device with integrated touch panel according to an embodiment of the present invention having the above-described configuration will now be described in detail.

The method of driving the display device with integrated touch panel according to an embodiment of the present invention includes: an operation in which when the image display period arrives, the display driver IC 120 equipped in the panel 110 supplies the common voltage to the touch electrodes 131 which are formed in the panel 110; an operation in which when the touch sensing period arrives, the display driver IC 120 supplies the touch pulse to the touch electrodes 131; an operation in which when analog sensing signals are received from the touch electrodes 131, the display driver IC 120 converts the analog sensing signals into digital sensing signals; an operation in which the display driver IC 120 transfers the digital sensing signals to the touch IC 140; and an operation in which the touch IC 140 analyzes the digital sensing signal by using the analysis program based on the self-capacitance type to determine whether the touch panel 130 is touched.

Here, in the operation of transferring the digital sensing signals to the touch IC 140, the display driver IC 120 transfers the digital sensing signals to the touch IC 140, mounted on the FPCB 150, through the touch channel lines 141 which are formed on the FPCB 150 connected to the display driver IC 120.

Moreover, in the operation of supplying the touch pulse, the touch pulse is supplied to a plurality of touch electrodes 131 included in one of the touch electrode small groups MUX1 to MUX 3 which are each configured with at least two or more touch electrodes 131, and then is supplied to a plurality of touch electrodes 131 included in another touch electrode small group.

The operations will now be described in more detail with reference to FIG. 4.

Figure 4:
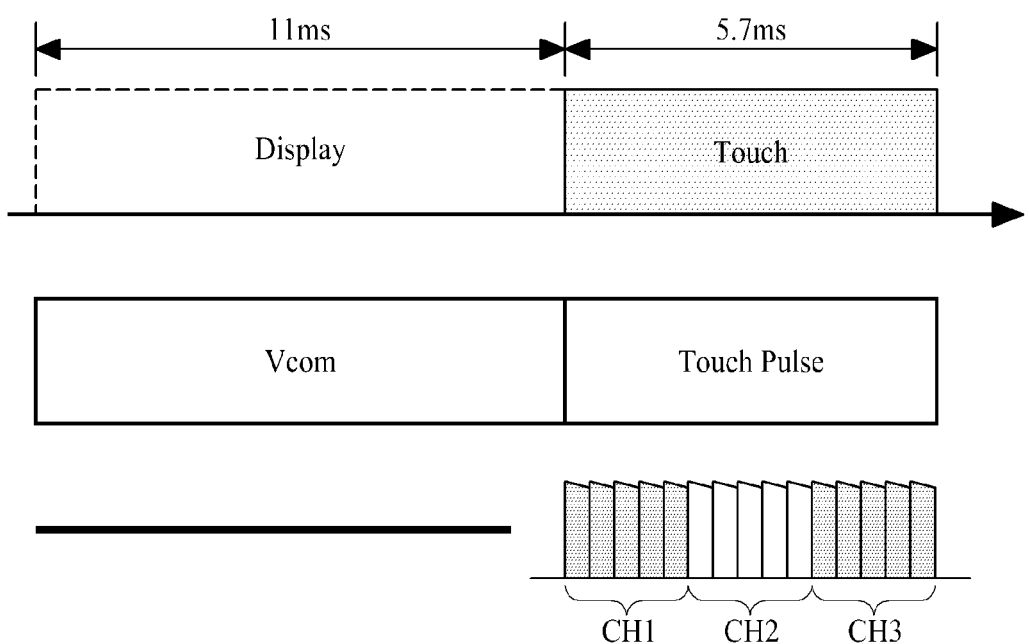
FIG. 4 is an exemplary diagram showing a timing when a common voltage and a touch pulse are supplied to a panel in the display device with integrated touch panel according to an embodiment of the present invention.

FIG. 4 is an exemplary diagram showing a timing when the common voltage and the touch pulse are supplied to a panel in the display device with integrated touch panel according to an embodiment of the present invention.

In a first operation, when an operation time of the display device with integrated touch panel according to an embodiment of the present invention is the image display period, the touch sync signal generator 122 generates the zeroth touch sync signal '0' to transfer the zeroth touch sync signal '0' to the first switch 127 of each group touch electrode switch 126 configuring the switching unit 125 according to control by the controller 121. The channel switching signal generator 123 generates the zeroth channel switching signal '00' to transfer the zeroth channel switching signal '00' to the second switch 128 of each group touch electrode switch 126 configuring the switching unit 125.

In a second operation, the first switches 127 are switched on according to the zeroth touch synch signal '0' and are connected to the common voltage generator 124, and the second switches 128 are switched on according to the zeroth channel switching signal and are connected to all the multiplexer channels (the touch electrode lines) 132.

In a third operation, each grouch touch electrode switch 126 is connected, and thus, the common voltage (Vcom) generated by the common voltage generator 124 is supplied to all the touch electrodes 131, configuring the touch panel 130, through the switching unit 125. A supply timing of the common voltage (Vcom) is shown in FIG. 4. That is, the common voltage (Vcom) is supplied to the touch electrodes 131 during the image display period (illustrated as Display in FIG. 4) of 11 ms.

In a fourth operation, when the image display period is ended and the touch sensing period (illustrated as Touch in FIG. 4) arrives, the touch sync signal generator 122 generates the first touch sync signal '1' to transfer the first touch sync signal '1' to the first switch 127 of each group touch electrode switch 126 configuring the switching unit 125 according to control by the controller 121. The channel switching signal generator 123 generates the first channel switching signal '01' to transfer the first channel switching signal '01' to the second switch 128 of each group touch electrode switch 126 configuring the switching unit 125.

In a fifth operation, the first switches 127 are switched on according to the first touch synch signal '1' and are connected to the analog unit 129, and the second switches 128 are switched on according to the first channel switching signal and are connected to the first multiplexer channels.

In a sixth operation, each grouch touch electrode switch 126 is connected, and thus, a first touch pulse (Touch Pulse) generated by the analog unit 129 is supplied to all the touch electrodes, connected to first multiplexer channels of all the touch electrodes 131 configuring the touch panel 130, through the switching unit 125. A plurality of touch electrodes connected to the first multiplexer channels configure the first touch electrode small group MUX1.

A supply timing of the first touch pulse is shown in FIG. 4. That is, during a period corresponding to one-third of the touch sensing period of 5.7 ms, the first touch pulse is supplied to the touch electrodes 131 connected to the first multiplexer channels CH1. To this end, the controller 121 may transfer a control signal, which requests an output of the first touch pulse, to the analog unit 129.

The analog unit 129 transfers the first touch pulse through the 80 analog channel lines 129*a*. In this case, since each of the analog channel lines 129*a* is connected to a predetermined touch electrode, the touch IC 140 connected to the analog unit 129 analyzes the digital sensing signal transferred through each analog channel line 129*a* by using the analysis program, thereby determining whether the touch electrode is touched. The touch IC 140 may determine whether the touch electrode is touched, by using a change amount of a capacitance of the touch electrode 131.

In a seventh operation, the first touch pulse is supplied to the touch electrodes connected to the first multiplexer channels CH1 during one-third of the touch sensing period through the above-description operation, and then, the channel switching signal generator 123 generates the second channel switching signal '10' to transfer the second channel switching signal '10' to the second switch 128 of each group touch electrode switch 126 configuring the switching unit 125 according to control by the controller 121. At this time, the touch sync signal generator 122 generates the first touch sync signal '1' to transfer the first touch sync signal '1' to the first switch 127 of each group touch electrode switch 126 configuring the switching unit 125.

In an eighth operation, the first switches 127 are switched on according to the first sync signal '1' which is continuously supplied and are connected to the analog unit 129, and the second switches 128 are switched on according to the second channel switching signal '10' and are connected to the second multiplexer channels CH2.

In a ninth operation, each group touch electrode switch 126 is connected as described above, and thus, the second touch pulse (Touch Pulse) generated by the analog unit 129 is supplied to a plurality of touch electrodes connected to the second multiplexer channels CH2 among all the touch electrodes 131 configuring the touch panel 130.

A supply timing of the second touch pulse is shown in FIG. 4. That is, during a period corresponding to other one-third of the touch sensing period of 5.7 ms, the second touch pulse is supplied to the touch electrodes 131 connected to the second multiplexer channels CH2. To this end, the controller 121 may transfer a control signal, which requests an output of the first touch pulse, to the analog unit 129.

The analog unit 129 transfers the second touch pulse through the 80 analog channel lines 129*a*. In this case, since each of the analog channel lines 129*a* is connected to a predetermined touch electrode, the touch IC 140 connected to the analog unit 129 analyzes the digital sensing signal transferred through each analog channel line 129*a* by using the analysis program, thereby determining whether the touch electrode is touched. The touch IC 140 may determine whether the touch electrode is touched, by using a change amount of a capacitance of the touch electrode 131.

In a tenth operation, the second touch pulse is supplied to the touch electrodes connected to the second multiplexer channels CH2 during other one-third of the touch sensing period through the above-description operation, and then, the channel switching signal generator 123 generates the third channel switching signal '11' to transfer the third channel switching signal '11' to the second switch 128 of each group touch electrode switch 126 configuring the switching unit 125 according to control by the controller 121. The touch sync signal generator 122 generates the first touch sync signal '1' to transfer the first touch sync signal '1' to the first switch 127 of each group touch electrode switch 126 configuring the switching unit 125.

In an eleventh operation, the first switches 127 are switched on according to the first sync signal '1' which is continuously supplied and are connected to the analog unit 129, and the second switches 128 are switched on according to the third channel switching signal '11' and are connected to the third multiplexer channels CH3.

In a twelfth operation, each group touch electrode switch 126 is connected as described above, and thus, the third touch pulse (Touch Pulse) generated by the analog unit 129 is supplied to a plurality of touch electrodes connected to the third multiplexer channels CH3 among all the touch electrodes 131 configuring the touch panel 130.

A supply timing of the third touch pulse is shown in FIG. 4. That is, during a period corresponding to other one-third of the touch sensing period of 5.7 ms, the third touch pulse is supplied to the touch electrodes 131 connected to the third multiplexer channels CH3. To this end, the controller 121 may transfer a control signal, which requests an output of the first touch pulse, to the analog unit 129.

The analog unit 129 transfers the second touch pulse through the 80 analog channel lines 129*a*. In this case, since each of the analog channel lines 129*a* is connected to a predetermined touch electrode, the touch IC 140 connected to the analog unit 129 analyzes the digital sensing signal transferred through each analog channel line 129*a* by using the analysis program, thereby determining whether the touch electrode is touched. The touch IC 140 may determine whether the touch electrode is touched, by using a change amount of a capacitance of the touch electrode 131.

Subsequently, the display device may repeatedly perform the above-described first to twelfth operations.

The above-described display device with integrated touch panel according to an embodiment of the present invention will be summarized.

The related art display device with integrated touch panel includes an excessive number of touch channel lines (80 to 88 lines) and a bulky FPCB which has large volume due to a touch IC having a relatively large chip size (6×6 mm$^2$) For this reason, a module design is limited, and there is a limitation in assembling a system set. Also, an excessive number of touch channel lines and a relatively large size are vulnerable to an external physical impact, and for this reason, touch ghost noise is easily caused. Also, since the number of pins of the touch IC and the display driver IC increases, an error rate increases in a module process.

In order to solve such problems, in the display device with integrated touch panel according to an embodiment of the present invention, the analog unit which performs an analog operation in a related art touch IC is built into the display driver IC 120 mounted on the panel 110. Therefore, the touch IC 140 applied to the display device with integrated touch panel according to an embodiment of the present invention includes the touch sensing unit 142, which determines a touch by using a digital sensing signal generated by the analog unit of the related art touch IC and the analysis program, and the memory 143 which stores the analysis program.

According to an embodiment of the present invention, since the touch IC 140 is mounted on the FPCB 150, the plurality of touch channel lines 141 cannot be exposed to the FPCB 150. Also, a chip size of the touch IC 140 can be reduced by about one-fourth (3×3 mm$^2$).

In this case, only 2 to 7 touch channel lines 141 for an interface between the display driver IC 120 and the touch IC 140 can be exposed to the FPCB 140.

Therefore, touch ghost noise caused by an external impact is removed, and a degree of free of a module design can increase. Also, an error rate can be reduced in mounting a chip.

The display driver IC 120 may be configured so as to enable serial data to be transferred between the touch IC 140 and an SPI interface, and may mainly operate as a slave.

The touch IC 140 may mainly operate as a master. The touch IC 140 may receive a sync signal, which is used to determine a transmission time of the digital sensing signal, from the display driver IC 120.

A storage unit, which stores an analog sensing signal for each of the multiplexer channels CH1 to CH3, may be provided in the display driver IC 120. The storage unit may be provided in the analog unit 129 of the display driver IC 120, or may be provided independently from the analog unit 129.

The display driver IC 120 may generate the sync signal for transferring the digital sensing signal, for which conversion has been completed by the analog unit 129, to the touch IC 140.

According to the embodiments of the present invention, the FPCB is simplified, and thus, a design of the display device with integrated touch panel can be changed to various shapes.

Moreover, since the number of the touch channel lines and a size of the touch IC are reduced, the display device with integrated touch panel which is robust to an external physical impact can be manufactured. Accordingly, touch ghost noise can be removed, and a quality of a touch can be improved.

Moreover, an area of the FPCB can be reduced, and an error rate can be reduced in a process of mounting the touch IC on the FPCB. Accordingly, the manufacturing cost of the display device with integrated touch panel can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch panel, comprising:
   a panel in which a plurality of pixels defined by intersections between a plurality of data lines and a plurality of gate lines are formed, the panel including a plurality of touch electrodes;
   a display driver IC configured to control the plurality of data lines and the plurality of gate lines formed in the panel, supply a common voltage or a touch pulse to the plurality of touch electrodes, receive analog sensing signals from the touch electrodes via a first, analog interface, and convert the analog sensing signals into digital sensing signals; and
   a touch IC configured to receive the digital sensing signals from the display driver IC via a second, digital interface that is external to the touch IC and on a circuit board connecting the panel with the touch IC, and analyze the digital sensing signals by using an analysis program based on a self-capacitance type to determine whether the panel is touched, a first number of channels in the first, analog interface being greater than a second number of channels in the second, digital interface.

2. The display device of claim 1, wherein,
   the circuit board is a flexible printed circuit board (FPCB) and the touch IC is mounted on the flexible printed circuit board (FPCB), and
   the digital sensing signals are transferred from the display driver IC to the touch IC through the second, digital interface comprised of 2 to 7 touch channel lines which are formed on the FPCB.

3. The display device of claim 1, wherein the touch IC comprises:
   a memory configured to store the analysis program; and
   a touch sensing unit configured to analyze the digital sensing signals received from the display driver IC by using the analysis program to determine whether the panel is touched.

4. The display device of claim 1, wherein,
   the plurality of touch electrodes are divided into at least two touch electrode large groups,
   the at least two touch electrode large groups are sequentially arranged in a direction from one side to the other side of the touch panel,
   a plurality of touch electrodes included in each of the at least two touch electrode large groups are divided into a plurality of touch electrode small groups corresponding to number of touch electrode lines connected to each of a plurality of group touch electrode switches which are provided in the display driver IC, and the plurality of touch electrode small groups are sequentially arranged in a direction from one side to the other side of each of the plurality of touch electrode large groups.

5. The display device of claim 4, wherein during a touch sensing period, the group touch electrode switch supplies the touch pulse to a plurality of touch electrodes included in one of the plurality of touch electrode small groups, and then supplies the touch pulse to a plurality of touch electrodes included in another touch electrode small group.

6. The display device of claim 4, wherein,
a plurality of group touch electrode switches connected to each of the at least two touch electrode large groups configure a switch group, and
a plurality of the switch groups corresponding to the at least two touch electrode large groups are separated from each other in the display driver IC.

7. The display device of claim 1, wherein the display driver IC comprises:
a common voltage generator configured to generate the common voltage which is to be supplied to the plurality of touch electrodes;
a switching unit configured to include a plurality of group touch electrode switches connected to at least two or more of a plurality of touch electrode lines;
an analog unit configured to convert the analog sensing signals, transferred from the touch electrodes through the switching unit, into the digital sensing signals to transfer the digital sensing signals to the touch IC;
a touch sync signal generator configured to generate a touch sync signal which allows the plurality of group touch electrode switches to connect the plurality of touch electrode lines to the common voltage generator or the analog unit; and
a channel switching signal generator configured to generate a channel switching signal which allows the plurality of group touch electrode switches to be connected to all the plurality of touch electrode lines during an image display period, and during the touch sensing period allows the analog unit to be connected to a plurality of touch electrode lines connected to each of the plurality of group touch electrode switches.

8. A method of driving a display device with integrated touch panel, the method comprising:
during an image display period, by a display driver IC equipped in a panel, supplying a common voltage to a plurality of touch electrodes which are formed in the panel;
during a touch sensing period, by the display driver IC, supplying a touch pulse to the plurality of touch electrodes;
by the display driver IC, converting analog sensing signals received from the plurality of touch electrodes via a first, analog interface into digital sensing signals;
transferring, by the display driver IC, the digital sensing signals to a touch IC via a second, digital interface that is external to the touch IC and on a circuit board connecting the panel with the touch IC, a first number of channels in the first, analog interface being greater than a second number of channels in the second, digital interface; and
analyzing, by the touch IC, the digital sensing signals by using an analysis program based on a self-capacitance type to determine whether the panel is touched.

9. The method of claim 8, wherein the circuit board is a flexible printed circuit board (FPCB) and the transferring of the digital sensing signals comprises transferring, by the display driver IC, the digital sensing signals to the touch IC, mounted on the flexible printed circuit board (FPCB), through the second, digital interface comprised of a plurality of touch channel lines which are formed on the FPCB connected to the display driver IC.

10. The method of claim 8, wherein the supplying the touch pulse comprises supplying the touch pulse to a plurality of touch electrodes included in one of a plurality of touch electrode small groups which are each configured with at least two or more touch electrodes, and supplying the touch pulse to a plurality of touch electrodes included in another touch electrode small group.

11. A display driver IC for driving a display device with integrated touch panel, the display device including a panel in which a plurality of pixels defined by intersections between a plurality of data lines and a plurality of gate lines are formed, the panel including a plurality of touch electrodes, the display driver IC comprising:
switching circuitry to supply a common voltage to the plurality of touch electrodes during an image display period and a touch pulse to the plurality of touch electrodes during a touch sensing period;
analog to digital converter circuitry to receive analog sensing signals from the touch electrodes in response to the touch pulse via a first, analog interface, and convert the analog sensing signals into digital sensing signals, the analog to digital converter circuitry providing the digital sensing signals to a touch IC via a second, digital interface that is external to the touch IC and on a circuit board connecting the panel with the touch IC, a first number of channels in the first, analog interface being greater than a second number of channels in the second, digital interface, and the touch IC configured to analyze the digital sensing signals by using an analysis program based on a self-capacitance type to determine whether the panel is touched.

12. The display driver IC of claim 11, wherein,
the circuit board is a flexible printed circuit board (FPCB) and the touch IC is mounted on the flexible printed circuit board (FPCB), and
the digital sensing signals are provided to the touch IC through the second, digital interface comprised of 2 to 7 touch channel lines which are formed on the FPCB.

* * * * *